Figures 1, 2:
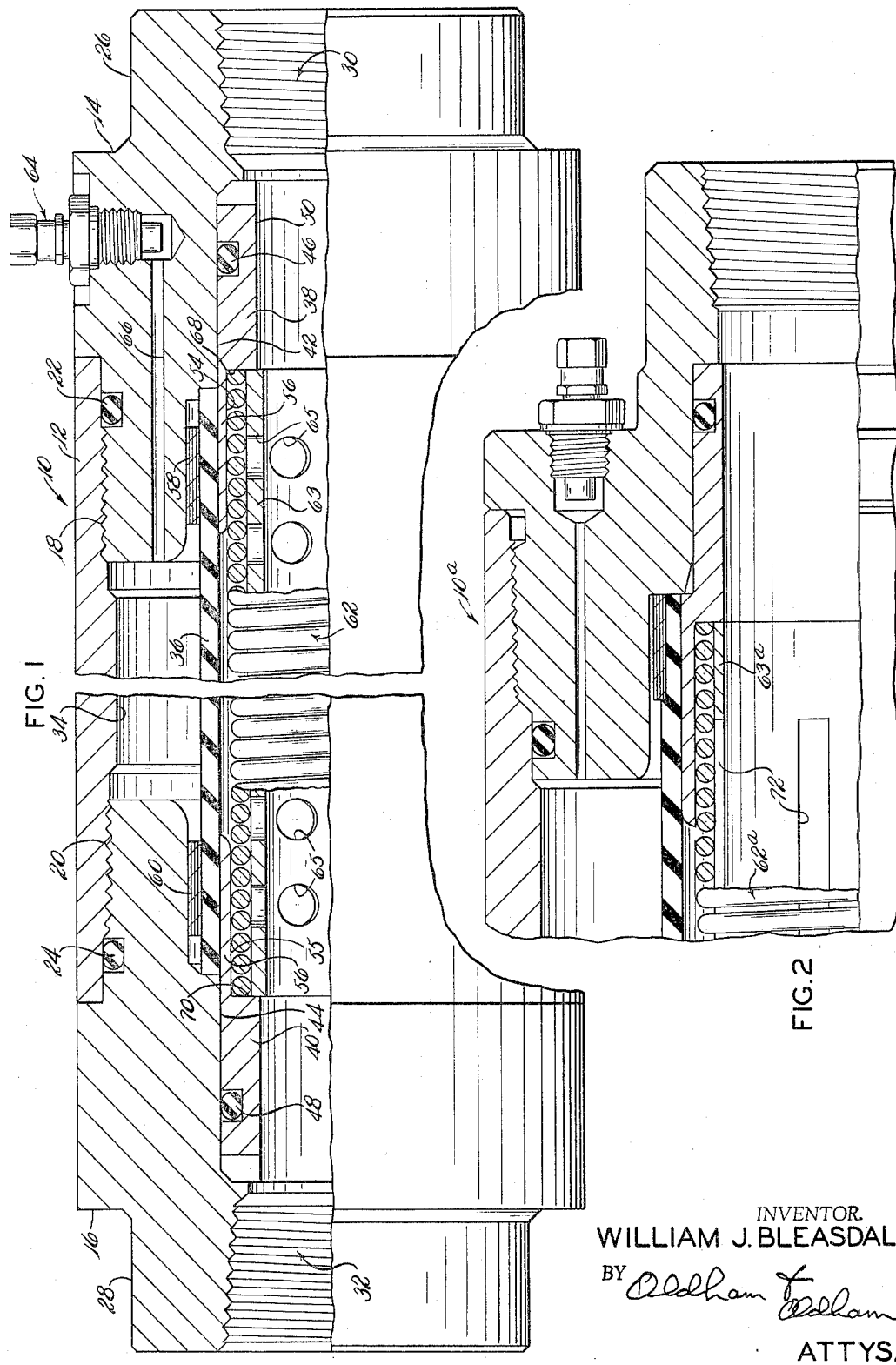

Oct. 4, 1966   W. J. BLEASDALE   3,276,478
REENFORCED PRESSURE SURGE CUSHIONING MEANS FOR
A HYDRAULIC SYSTEM
Filed Sept. 18, 1963

INVENTOR.
WILLIAM J. BLEASDALE
BY Oldham & Oldham
ATTYS.

United States Patent Office 3,276,478
Patented Oct. 4, 1966

3,276,478
REENFORCED PRESSURE SURGE CUSHIONING
MEANS FOR A HYDRAULIC SYSTEM
William J. Bleasdale, 17834 Rosecliff Road,
Cleveland, Ohio
Filed Sept. 18, 1963, Ser. No. 309,754
8 Claims. (Cl. 138—30)

This invention relates to a cushioning means for a hydraulic system, and more particularly to a new and improved accumulator, or other member, attachable to a hydraulic system to substantially lessen pressure shocks caused in hydraulic systems due to pumping means, and sudden pressure changes in the system.

Heretofore it has been known that there are many and varied types of accumulators to perform various functions in pressure systems. Conventional accumulators, or similar members, usually consist of a container divided by an elastic partition or diaphragm into two chambers one of which is intended to receive a gas under a preload pressure, the other one to receive, store or deliver a fluid, usually a liquid, according to the instantaneous fluid pressure prevailing in the hydraulic system. The performance of the accumulator essentially depends on the ratio of the preload gas pressure to the maximum line pressure of the system, and performance of this ratio is almost totally dependent on the means available to easily and smoothly transmit the pressure differential between the preload gas pressure and the line pressure in the system. In the past, this has been accomplished by utilizing directly connected to the hydraulic line, a rigid pipe-like member having a plurality of very small holes therein, with the elastic partition or diaphragm separating this pipe-like member from the air pressure chamber. Thus, under operation, the fluid pressure change passing through the holes in the pipe-like member is very slow, and inefficient. Further, the elastic partition or diaphragm tends to force itself into the holes when the line pressure is low thereby causing damage or rupture to the elastic partition or diaphragm. Thus, in the conventional system, the pressure cushioning is frequently slow, jerky, and unsatisfactory, and the possibility always exists that when the line pressure is exceedingly low, the diaphragm will rupture because it is forced into the holes in the rigid pipe-like member.

It is the general object of the present invention to avoid and overcome the foregoing difficulties and other objections to prior art practices by the provisions of a cushioning means for hydraulic systems which utilizes an improved structural relation between the elastic partition or diaphragm and the hydraulic line to provide a highly effective fluid cushioning means to eliminate shocks in hydraulic lines caused by abrupt pressure changes in fluid systems resultant from valve action, pumping means, or other causes, and which new structure is inexpensive, durable, and highly effective.

A further object of the invention is to provide an improved cushioning means for hydraulic systems which includes a floating closely spaced, helically wound coil-like member in, or connected to the hydraulic fluid pressure line, which member lies coaxially inside a flexible elastic partition or diaphragm to effect smooth, but rapid pressure changes between the line and the diaphragm, and is internally reenforced by an apertured support tube.

A further object of the invention is to provide an accumulator which will effect superior hydraulic cushioning and/or pressure maintenance action, which accumulator is smoothly and rapidly responsive, and which accumulator is highly durable, of uncomplicated construction, and inexpensive.

The aforesaid objects of the invention and other objects, which will become apparent as the description proceeds are achieved by providing in an accumulator, or similar means in a hydraulic system, as one embodiment of the invention, the combination of a substantially cylindrical open ended container, a flexible tubular diaphragm of elastic material coaxially arranged within the container, connecting means received in the container at each end thereof, a helically wound metal coil means extending coaxially inside the diaphragm and operatively secured at each end to the connecting means, which connecting means are connectable to a hydraulic system or the like, an apertured support tube on which the coil means is positioned, and means to pass a pressure fluid into the container between the outer surface of the diaphragm and the inner surface of the container.

For a better understanding of the invention, reference should be had to the accompanying drawing, wherein:

FIG. 1 is a partially longitudinally sectioned, partially broken away elevation, of one embodiment of the principles of the invention; and FIG. 2 is a fragmentary section of a modified surge cushioning means of the invention.

Although the principles of the invention are broadly applicable to any means, or an accumulator which may have only one end thereof connected to a hydraulic pressure line for shock absorbing action, it also relates to means functioning as a thermal compensator, or as a leakage compensator, and the apparatus and means of the invention are usually employed as an accumulator connected at both ends to a hydraulic pressure line. Hence, the invention has been so illustrated and will be so described.

With specific reference to the form of the invention illustrated in the drawing, the numeral 10 indicates generally an apparatus that may be termed an accumulator comprising a tubular body, cylinder or container 12 and two end pieces, or headers 14 and 16 secured to the container 12 as by threaded means indicated at 18 and 20, respectively. In order to provide for the required strength, the container 12 and headers 14 and 16 are preferably made of high strength alloyed steel. However, if it were desired to make the accumulator lightweight, the heads 14 and 16 could be made from other materials, such as high strength aluminum, or aluminum alloyed forgings. A leakproof joint between the container 12 and the headers 14 and 16 may be obtained by providing conventional O-ring seals 22 and 24, or similar means, respectively, between the connected parts, as indicated in the drawing. The invention contemplates that the container 12 and headers 14 and 16 may be formed as one integral piece.

The headers 14 and 16 have reduced diameter ends 26 and 28, respectively, which provide apertures 30 and 32 for the admission and discharge of the hydraulic liquid from hydraulic lines (not shown) connected to a hydraulic system with which the accumulator is used. The combination of the container 12 and headers 14 and 16 defines a chamber 34.

Coaxially aligned with the container 12 within the chamber 34 is a flexible partition, or tubular diaphragm 36. The diaphragm 36 must have an elasticity to alter its size, preferably without wrinkling, and must be impermeable to the medium, generally air, or an inert gas such as nitrogen, surrounding its outer surface, and the medium, generally hydraulic liquid, contacting its inner surface.

In order to operatively connect the diaphragm 36 to the apertures 30 and 32, suitable means such as a pair of pipe-like connecting members 38 and 40, respectively, are provided. The members 38 and 40 are removably received in counterbored recesses 42 and 44 in the heads 14 and 16, respectively. To achieve a seal between the members 38 and 40 and the heads 14 and 16, O-ring seals 46 and 48, or equivalents, are provided.

As seen in the sectioned portion of the drawing, the bore through the member 38, indicated generally by the numeral 50, is operatively aligned in registry with the aperture 30. For the purpose of securing the diaphragm 36 to the members 38 and 40, an annular flange 56 is provided on the radially outward side of the inward ends thereof. Pressed clamp bands 58 and 60, or equivalent means, complete the seal of the ends of the diaphragm 36 to the members 38 and 40.

A helically wound coil 62 made of a material that may be substantially square, rectangular, or round in cross section, extends coaxially inside the diaphragm 36 and is operatively carried at each end in recessed or counterbored end portions indicated by the numerals 54 and 55 for the members 38 and 40. The coil 62 may have a small limited longitudinal floating action in relation to the members 38 and 40. The coil 62 is preferably wound like a helical spring and has adjacent but spaced convolutions, and preferably has some spring action.

The coil 62 enables fluid pressure to pass rapidly between the adjacent convolutions to provide an effective means to transfer pressure rapidly from the hydraulic line (not shown) towards the gas chamber 34, or vice versa, through the flexible walls of the diaphragm 36. As an important feature of the invention, the coil 62 acts as a frame which limits the inward movement of the diaphragm 36. The adjacent sides of the helically windings of the coil 62 are uniformly spaced, and quite small in relation to the sectional width of the metal wire used to form the convolutions. Therefore, since the outer surfaces of each convolution, as shown, are arcuate, and the spacing between the convolutions is very small, the diaphragm 36 will not be unduly stressed with a localized pressure in any area when the diaphragm 36 is forced against the coil 62 when hydraulic pressure is low, thereby greatly reducing any possibility of rupture or damage to the diaphragm 36. Also, since the coil 62 may be floatingly, or freely positioned in the members 38 and 40, it may have a limited degree of longitudinal motion, and the position of the coil 62 in relation to the diaphragm 36 may change with pressure changes. Thus, it is seen that the coil 62 provides an excellent frame support for the diaphragm 36, when needed, while also effecting a smooth almost instantaneous pressure transfer between adjacent convolutions of the helical windings to the diaphragm on abrupt pressure changes.

As a further important feature of the invention, the coil 62 is supported on and distortion of the coil is prevented by positioning the coil on a metal tube 63 that has a plurality of relatively large apertures 65 usually uniformly provided therein preferably in relatively closely spaced relation over its entire circumference and length. These apertures 65 are large enough, for example between about ¼ to ½ inch, as to provide substantially no retarding action to the instantaneous flow of sufficient pressure fluid therethrough so that pressure impacts in the fluid system will be transmitted to the coils 62 and be transmitted therethrough substantially instantaneously to the diaphragm 36 for rapid cushioning action by the apparatus of the invention. Or, the apertures 65 may be in the form of one or more elongate slots, or be of any suitable form to transmit a quantity of pressure fluid without any appreciable resistance to the flow through the apertures.

Suitable valve means 64 are secured to the header 14 to supply the chamber 34 with pressure fluid, as desired, through a bore 66 provided in the header and connecting to the valve 64. Generally, the chamber 34 will be maintained at a pressure slightly lower than the usual hydraulic line pressure to maintain the proper cushioning action desired.

It should be noted, however, that the accumulator of the invention could be placed in a hydraulic pressure line at only one end with the other end capped or sealed, and the purposes and advantages of the invention would still be realized.

While the coil 62 is essentially a spring, the invention contemplates use of any similar tubular member having an elongate helical slit provided therein. Such coil or tubular member serves as a support means for the flexible diaphragm when the system pressure is reduced.

The ends of the spring 62 and the tube 63 may abut on shoulders 68 and 70 formed in the members 38 and 40, respectively, to secure them in position. Usually the spring 62 should be freely telescoped over the tube 63 but be retained thereby against any appreciable radial distortion even under the most severe pressure shocks or conditions. In systems where no severe pressure shocks occur, the apertured support, or tube 63 may be omitted. When the tube 63 is used, the pressure fluid supply connects operably to the bore of the tube which will have sufficient apertures therein of such size that the tube 63 presents no real obstruction to flow of pressure fluid therethrough.

FIG. 2 shows a modified accumulator 10a that is generally similar to the structure shown in FIG. 1. However, a metal tube 63a is provided within a metal spring or coil 62a for preventing radial distortion thereof. The tube 63a has one or more longitudinally extending slits, or slots 72 therein for rapid passage of pressure fluid therethrough.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. Means for use with a fluid system for pressure storage and/or cushioning action with the system and comprising
   a container means connectable to the fluid system to receive pressure fluid therefrom,
   a flexible diaphragm secured to said container means in sealed engagement therewith to form a chamber within said container means sealed from the fluid system,
   valve means carried by said container means and connecting to said chamber for filling and inflating said chamber with a gas,
   coil spring-like support means for said diaphragm positioned on said container means within said diaphragm, said support means receiving said pressure fluid therein and having an elongate helical slit therein, and
   a hollow metal reenforcing member snugly positioned within said support means and preventing any noticeable radial deflection thereof, said reenforcing member having a plurality of relatively large apertures formed therein for rapid transfer of fluid therethrough, said reenforcing member receiving said pressure fluid therein.

2. In a cushioning means for a hydraulic system, the combination of a container having closed ends with an aperture through each end, a tube-like resilient diaphragm arranged within said container with the ends thereof aligned with and operatively connected and sealed to said apertures as to define a closed conduit from one aperture to the other through the container, a helically wound coil arranged within said diaphragm and supported at each end in limited longitudinal sliding engagement with said apertures, said coil having an outer diameter slightly less than the normal inner diameter of said diaphragm, and said coil having a substantially smoothly contoured outer surface with the sectional width of the convolution forming member thereof being substantially greater than the spacing between convolutions, a tubular metal support positioned within said coil and reenforcing it against radial movement, said metal support having relatively large apertures therein substantially uniformly spaced over its periphery for substantially the length thereof, said metal support being operatively engaged with said container ends and being adapted to receive pressure fluid from an associated fluid pressure system, and means to pass fluid into said container between the outer surface of said diaphragm and the inner surface of said container.

3. In a cushioning means for a hydraulic system, the combination of a container having closed ends with an aperture through each end for connection to a hydraulic system, a resilient tubular diaphragm arranged within said container with the ends thereof aligned with and operatively connected and sealed to said apertures as to define a closed conduit from one aperture to the other through the container, a helically wound coil having closely spaced convolutions and having an outer diameter slightly less than the normal inner diameter of said diaphragm positioned within said diaphragm, a support tube having an outer diameter slightly smaller than the bore diameter of said coil positioned within said coil to prevent radial distortion thereof, said support tube having a plurality of apertures therein for rapidly transmitting pressure fluid therethrough and being operatively connected to said container ends, and means to pass fluid into said container between the outer surfaces of said diaphragm and the inner surface of said container.

4. In a cushioning means for a hydraulic system, the combination of a container having open ends, headers on each end of the container, an aperture through each header, seal means between the headers and the container, a flexible tube-shaped diaphragm arranged within said container so that the ends of the diaphragm are aligned with said apertures, means carried by the headers and aligned with the apertures to connect each end of the diaphragm in sealed relation to the headers, a closely spaced helically wound coil arranged within said diaphragm for reenforcing it on radially inward movement thereof and supported at each end on said means, a support tube of a size to prevent any extensive radial distortion of said coil positioned within said coil and having apertures therein for rapid transmittal of pressure fluid therethrough, said support tube being positioned on said means, and means to pass pressure fluid into the container between the outer surface of the bag and the inner surface of the container.

5. In a cushioning means for a hydraulic system, the combination of a container having open ends, headers on each end of the container, an aperture through each header, seal means between the headers and the container, a flexible tube-shaped diaphragm arranged within said container so that the ends of the diaphragm are aligned with said apertures, means carried by the headers and aligned with the apertures to connect each end of the diaphragm in sealed relation to the headers, a closely spaced helically wound coil arranged within said diaphragm and supported at each end on said means, said coil being made from a wire having a diameter of at least several times the length of the axial spacing between adjacent convolutions of said coil, a support tube of a size to prevent any extensive radial distortion of said coil positioned within said coil and having at least one opening therein for rapid transmittal of pressure fluid therethrough, said support tube being positioned on said means, and means to pass pressure fluid into the container between the outer surface of the bag and the inner surface of the container.

6. Means for use with a fluid system for pressure storage and/or cushioning action with the system and comprising a container means connectable to the fluid system to receive pressure fluid therefrom, a flexible diaphragm secured to said container means in sealed engagement therewith to form a chamber within said container means sealed from the fluid system, valve means carried by said container means and connecting to said chamber for filling and inflating said chamber with a gas, coil spring-like support means for said diaphragm positioned on said container means within said diaphragm for supporting said diaphragm on radially inward movement thereof, said support means receiving said pressure fluid therein and having an elongate helical slit therein, and a hollow metal reenforcing member snugly positioned within said support means and preventing any noticeable radial deflection thereof, said reenforcing member having at least one longitudinally extending aperture formed therein for rapid transfer of fluid therethrough, said reenforcing member receiving said pressure fluid therein.

7. Means for use with a fluid system for pressure storage and/or cushioning action with the system and comprising a container means connectable to the fluid system to receive pressure fluid therefrom, a flexible diaphragm secured to said container means in sealed engagement therewith to form a chamber within said container means sealed from the fluid system, valve means carried by said container means and connecting to said chamber for inflating said chamber with a gas, a helically shaped closely spaced convolution coil spring support means for said diaphragm operatively positioned within said container means and within said diaphragm, said coil spring of said support means having a smoothly contoured outer surface with the axial sectional length of the convolution forming member thereof being substantially greater than the spacing between adjacent convolutions, and a hollow tubular metal reenforcing member snugly positioned within said support means and preventing any noticeable radial deflection thereof, said reenforcing member having at least one aperture formed therein for rapid transfer of fluid therethrough, said reenforcing member receiving said pressure fluid therein.

8. Means as in claim 7 where said convolution forming member is at least as long in section in radial thickness as it is in axial length.

References Cited by the Examiner

UNITED STATES PATENTS

| | | | |
|---|---|---|---|
| 1,106,633 | 8/1914 | Denehie | 251—336 X |
| 2,353,143 | 7/1944 | Bryant | 92—90 X |
| 2,760,518 | 8/1956 | Peet | 138—30 |
| 2,786,642 | 3/1957 | Comb | 251—5 X |
| 2,838,073 | 6/1958 | Di Mattia et al. | 138—30 |
| 2,867,240 | 1/1959 | Bent | 138—30 |
| 2,945,665 | 7/1960 | Regan et al. | 251—5 X |
| 2,949,932 | 8/1960 | Hewitt | 138—30 |

FOREIGN PATENTS 989,742   5/1951   France.

LAVERNE D. GEIGER, *Primary Examiner.*

LEWIS J. LENNY, *Examiner.*

T. MOORHEAD, *Assistant Examiner.*